United States Patent
Hasan et al.

(10) Patent No.: US 8,483,335 B2
(45) Date of Patent: Jul. 9, 2013

(54) HYBRID RECEIVER WITH ALGORITHMIC COMBINING AND METHOD

(75) Inventors: Khairul Hasan, Gurgaon (IN); Eric Jones, Haryana (IN); Bruce Lee, Arlington, TX (US); Mikko Saily, Sipoo (FI); Sathiaseelan Sundaralingam, Gurgaon (IN)

(73) Assignee: Nokia Siemens Networks Oy, Espoo (FI)

( * ) Notice: Subject to any disclaimer, the term of this patent is extended or adjusted under 35 U.S.C. 154(b) by 1197 days.

(21) Appl. No.: 12/320,661

(22) Filed: Jan. 30, 2009

(65) Prior Publication Data
US 2010/0195711 A1 Aug. 5, 2010

(51) Int. Cl.
| H04L 25/08 | (2006.01) |
| H04L 1/00 | (2006.01) |
| H03K 6/04 | (2006.01) |
| H03K 5/01 | (2006.01) |
| H03D 1/06 | (2006.01) |
| H03D 1/04 | (2006.01) |
| H04B 1/10 | (2006.01) |

(52) U.S. Cl.
USPC ........... 375/346; 375/316; 375/324; 375/340; 375/348

(58) Field of Classification Search
USPC .................. 375/342, 316, 324, 340, 346, 348
See application file for complete search history.

(56) References Cited

U.S. PATENT DOCUMENTS

| 7,027,500 | B1 * | 4/2006 | Casas et al. | 375/232 |
| 7,286,606 | B2 * | 10/2007 | Maltsev et al. | 375/260 |
| 2006/0280257 | A1 * | 12/2006 | Kim | 375/267 |
| 2009/0135935 | A1 * | 5/2009 | Yang et al. | 375/265 |

* cited by examiner

Primary Examiner — Ted Wang
(74) Attorney, Agent, or Firm — Staas & Halsey LLP

(57) ABSTRACT

A hybrid receiver apparatus, a method, and a computer readable storage media encoded with a program are provided. The hybrid receiver apparatus a first receiver processor and a second receiver processor and a signal input by the hybrid receiver apparatus is processed by both the first receiver processor and the second receiver processor. The hybrid receiver apparatus includes a combiner unit combining data output from the first receiver processor with data output from the second receiver processor based on a weight values assigned to the data.

7 Claims, 7 Drawing Sheets

HYBRID RECEIVER WITH ALGORITHMIC COMBINING AND METHOD

BACKGROUND

1. Field

The embodiments discussed herein are directed to communications, a hybrid receiver, and algorithmic combining.

2. Description of the Related Art

Conventionally, an equalizer has been utilized in an attempt to address effects that can occur to signals such as multipath noise and interference. For example, an equalizer operating in a frequency domain, e.g., a Frequency Domain-Linear Equalizer (FD-LE) has been utilized in Base Transceiver System (BTS) products in an attempt to equalize samples of received signals.

In addition, utilization of a Frequency Domain-Decision Feedback Equalizer (FD-DFE) in a receiver has separately been proposed in a further attempt to equalize samples of received signals.

However, conventional solutions do not satisfactorily address communication requirements for signals subject to a wide range of signal-to-noise ratio (SNR) conditions or carrier-to-interference (C/I) conditions.

Accordingly, an apparatus and method are desired that satisfactorily address communication requirements for signals subject to a wide range of SNR and C/I conditions.

SUMMARY

It is an aspect of the embodiments discussed herein to provide an apparatus and a method that address communication requirements for signals subject to a range of SNR and C/I conditions.

The above aspects can be attained by an apparatus, a method, and a computer readable storage media encoded with a program that combine different receiver processing algorithms.

The above aspects can be attained by an apparatus, a method, and a computer readable storage media encoded with a program that derive samples from two or more different receiver signal processing paths, and combine the derived samples.

According to an exemplary embodiment, a hybrid receiver combines a first receiver processor and a second receiver processor with a signal input by the hybrid receiver apparatus being processed by both the first receiver processor and the second receiver processor.

According to an exemplary embodiment, a hybrid receiver combines a Frequency Domain-Linear Equalizer (FD-LE) processor and a Frequency Domain-Decision Feedback Equalizer (FD-DFE) processor with a signal input by the hybrid receiver apparatus being processed by both the FD-LE processor and the FD-DFE processor.

According to an exemplary embodiment, a method of improving communication performance includes deriving samples from two or more different receiver signal processing paths and combining the derived samples.

According to an exemplary embodiment, a method includes inputting a signal into a receiver, processing the inputted signal with two different receiver processing algorithms, assigning a weight value to a result of each of two different receiver processing algorithms, and outputting data based on the assigning the weight value.

According to an exemplary embodiment, a computer-readable storage media encoded with a program that when executed by a computer enables the computer to improve communications performance includes processing an inputted signal with a first equalizer processing algorithm and with a second equalizer processing algorithm, assigning a weight value to a result of each of two different receiver processing algorithms, and outputting data based on the assigning the weight value.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Conventional solutions do not satisfactorily address requirements for communication of signals subject to a wide range of signal-to-noise ratio (SNR) conditions or carrier-to-interference (C/I) conditions. For example, communication requirements for versions of a Global System for Mobile Communications (GSM) wireless service are to deliver data at higher rates then previous services. But such, communications can be subject to a wide range of SNR or C/I conditions.

A system with Enhanced Data Rates for GSM Evolution (EDGE) has communication requirements to support a faster high speed circuit switched data (HSCSD) and general packet radio service (GPRS) connection for a delivery of data, e.g., multimedia and other broadband applications to users such as mobile phone users and computer users, but can be subject to a wide range of SNR or C/I conditions. Thus, conventional solutions do not satisfactorily address communication requirements for Enhanced General Packet Radio Service 2 (EGPRS2) requirements for a wide range of SNR or C/I.

For example, conventional approaches to communications of data including FD-LE processing do not satisfactorily address stronger coding schemes such that can operate at lower SNR or C/I conditions. As another example, conventional approaches to communications of data including FD-DFE processing do not adequately address weaker coding schemes such that can operate at higher SNR or C/I conditions.

Figure 1:
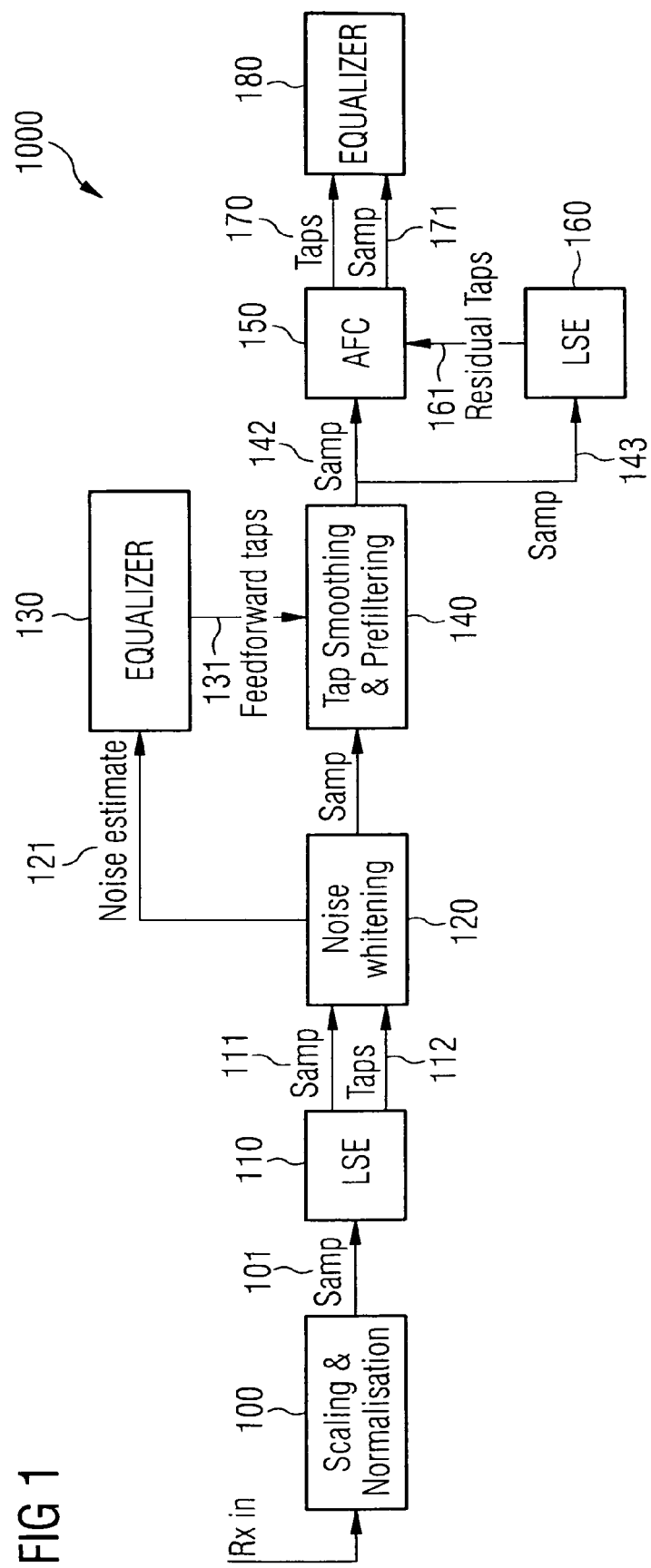
FIG. 1 illustrates an exemplary receiver chain including an equalizer.

FIG. 1 illustrates an example receiver chain 1000 including an equalizer, for example, a Frequency Domain Linear Equalizer (FD-LE). As illustrated in FIG. 1, components of the receiver chain 1000 include a scaling and normalization unit 100 providing a sample 101 to a Least Square Estimates (LSE) channel estimator unit 110 that provides a sample 111 and a tap 112 to a noise whitening unit 120.

As illustrated in FIG. 1, the noise whitening unit 120 outputs a noise estimate to an equalizer unit, for example, a FD-LE unit 130 which outputs a feedforward tap 131 to a tap smoothing and prefiltering unit 140. The tap smoothing and prefiltering unit 140 also inputs a sample 141 from the noise whitening unit 120 and outputs a sample 142 to an Automatic Frequency Correction (AFC) unit 150 and a sample 143 to a LSE estimator unit 160.

As illustrated in FIG. 1, the AFC unit 150 also inputs a residual tap 161 from the LSE estimator unit 160 and outputs, for example, a tap 170 and a sample 171 to an equalizer 180.

The FD-LE unit 130 can include, for example, a feedforward filter and a bit detector. The characteristics of the feedforward filter can be calculated, for example, utilizing Minimum Mean Square Estimator (MMSE) criteria. An example solution of an associated algorithm can assume that sample, after a pre-filtering via feedforward coefficients, do not have any Inter Symbol Interference (ISI) components.

As illustrated in FIG. 1, the ISI free samples (pre-filtered signal) can be passed to a LSE channel estimator unit and an AFC unit for frequency correction. The LSE channel estimator unit can estimate a residual channel that can be used by the AFC unit for frequency offset estimation. The residual channel estimator unit (i.e. LSE unit) can use pre-filtered samples and transmitted training sequence bits, which are known to the receiver, when computing the residual channel taps.

As illustrated in FIG. 1, the frequency corrected samples and the residual taps can be sent to the detector unit to estimate transmitted bits. An example detector unit of the FD-LE unit 130 can be a slicer equalizer or a trellis equalizer. For example, in a case of utilization of a slicer equalizer, the residual taps may not be needed.

With such a receiver chain 1000 including an equalizer such as the FD-LE, as illustrated in FIG. 1, a stronger performance can be seen in areas where input signal conditions are strong, for example, areas where many weaker coding schemes are operated. However, the receiver chain 1000 including the FD-LE, as illustrated in FIG. 1, may suffer from poor performance in areas where input signal conditions are weak and areas where most of stronger coding schemes are operated.

An example approach to attempt to mitigate deficiencies of a FD-LE receiver is by adding of a diversity antenna to the receiver. A problem with such an approach is that, however, is that a typical Mobile Station does not include multiple antennas. Accordingly, such an approach of adding a diversity antenna can increase the complexity of the associated platform and, thus, the cost of the mobile station.

Another example approach to attempt to address this deficiency is to use a receiver chain including another equalizer, for example, a FD-DFE and where feedforward and decision feedback taps can be estimated jointly using MMSE criterion.

Figure 2:
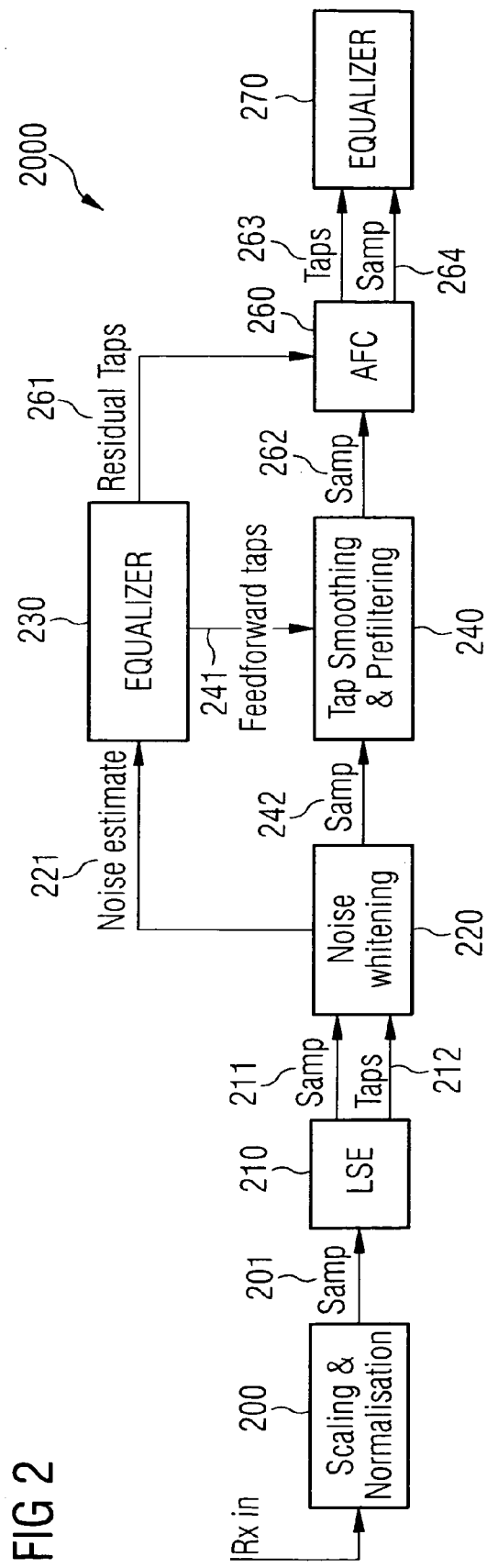
FIG. 2 illustrates an exemplary receiver chain including an equalizer.

FIG. 2 illustrates an example receiver chain 2000 including equalizer processing. The processing can be, for example, FD-DFE processing. As illustrated in FIG. 2, the receiver chain 2000 includes an input is provided to a scaling and normalization unit 200 that outputs a sample 201 to an LSE unit 210. The LSE unit 210 outputs a sample 211 and a tap 212 to a noise whitening unit 220.

As illustrated in FIG. 2, the noise whitening unit 220 outputs a noise estimate 221 to a FD-DFE unit 230. As illustrated in FIG. 2, the receiver chain 2000 also includes a tap smoothing and prefiltering unit 240 that inputs a feedforward tap 241 from the FD-DFE unit 230 and a sample 242 from the noise whitening unit 220. An AFC unit 260 inputs a residual tap 261 and from the FD-DFE unit 230 and a sample 262 from the tap smoothing and prefiltering unit 240. The AFC unit 20 outputs a tap 263 and a sample 264 to an equalizer 270.

Utilization of a receiver chain including equalizer processing such as FD-DFE processing, as illustrated in FIG. 2, can result in better communication performance than the receiver chain 1000 including FD-LE, as illustrated in FIG. 1, in areas where input signal conditions are weak. However, a receiver chain including FD-DFE processing, e.g., receiver chain 2000, can have poorer performance than a receiver chain including FD-LE processing, e.g., receiver chain 1000, in areas where input signal conditions are strong, i.e., very high SNR and C/I conditions.

According to an exemplary embodiment, a single receiver can combine two, or more, different receiver type algorithms, e.g., processing chains can be combined. Further, weights to outputs of each of the different receiver types can be appropriately assigned to optimize the performance of the individual candidates.

For example, a received signal can be processed in parallel via both FD-LE processing and FD-DFE processing and the outputs can be combined appropriately, for example, before bit detection. For example, algorithmic combining can be performed during an equalizer path metric computation. Performance of a pre-combining and a post-combining (before and after the equalizer path metric computation, respectively) can also be considered. However, such a consideration can require validation.

Figure 3:
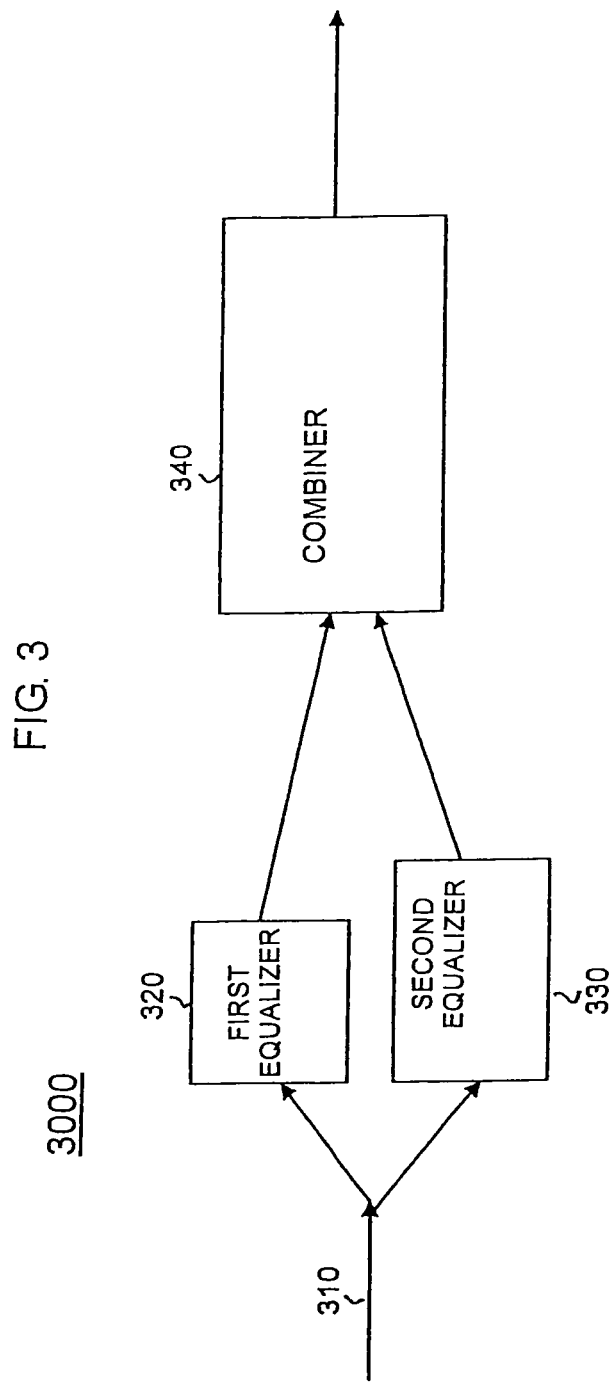
FIG. 3 illustrates a hybrid receiver according to an exemplary embodiment.

According to an exemplary embodiment, a hybrid receiver can combine different receiver processing algorithms into a single receiver device. FIG. 3 illustrates a hybrid receiver 3000 according to an exemplary embodiment. As illustrated in FIG. 3, the hybrid receiver 3000 includes an input 310 that is processed by both a first equalizer and second equalizer. The first equalizer and the second equalizer can include linear and non-linear equalizers, and time domain and frequency domain equalizers. For example, FIG. 3 illustrates a first equalizer processor 320, for example, a FD-LE processor and a second equalizer processor 330, for example, a FD-DFE processor.

According to an exemplary embodiment, a hybrid receiver can further combine results of the two or more different receiver processing algorithms with appropriate weights assigned to obtain best performance of the individual candidates. As illustrated in FIG. 3, results from the first equalizer processor 320 and the second equalizer 330 can be combined by a combiner 340.

According to an exemplary embodiment, example weight values can be derived from a noise variance or SNR. Values can be defined, for example, using equation (1) in which following weights have been used:

$$w_{FDDFE} = \min\left(1, \frac{snr_{FDDFE}}{(snr_{FDDFE} + snr_{FDLE})} + c\right) \quad (1)$$

$$w_{FDLE} = 1 - w_{FDMMSE}$$

where "snr" represents a signal to noise ratio, "w" represents a weight factor, and "c" represents a constant utilized to provide a biased weight.

For example, if environmental conditions are such that indicate that FD-DFE performance would be stronger and given a more favourable weight then the value of c can be chosen as a small positive number. However, according to an exemplary embodiment, the value of c can be made adaptive. That is, the value of c can be adaptively based on estimates of environmental conditions such, for example as a presence of adjacent channel interference, etc.

Figure 4:
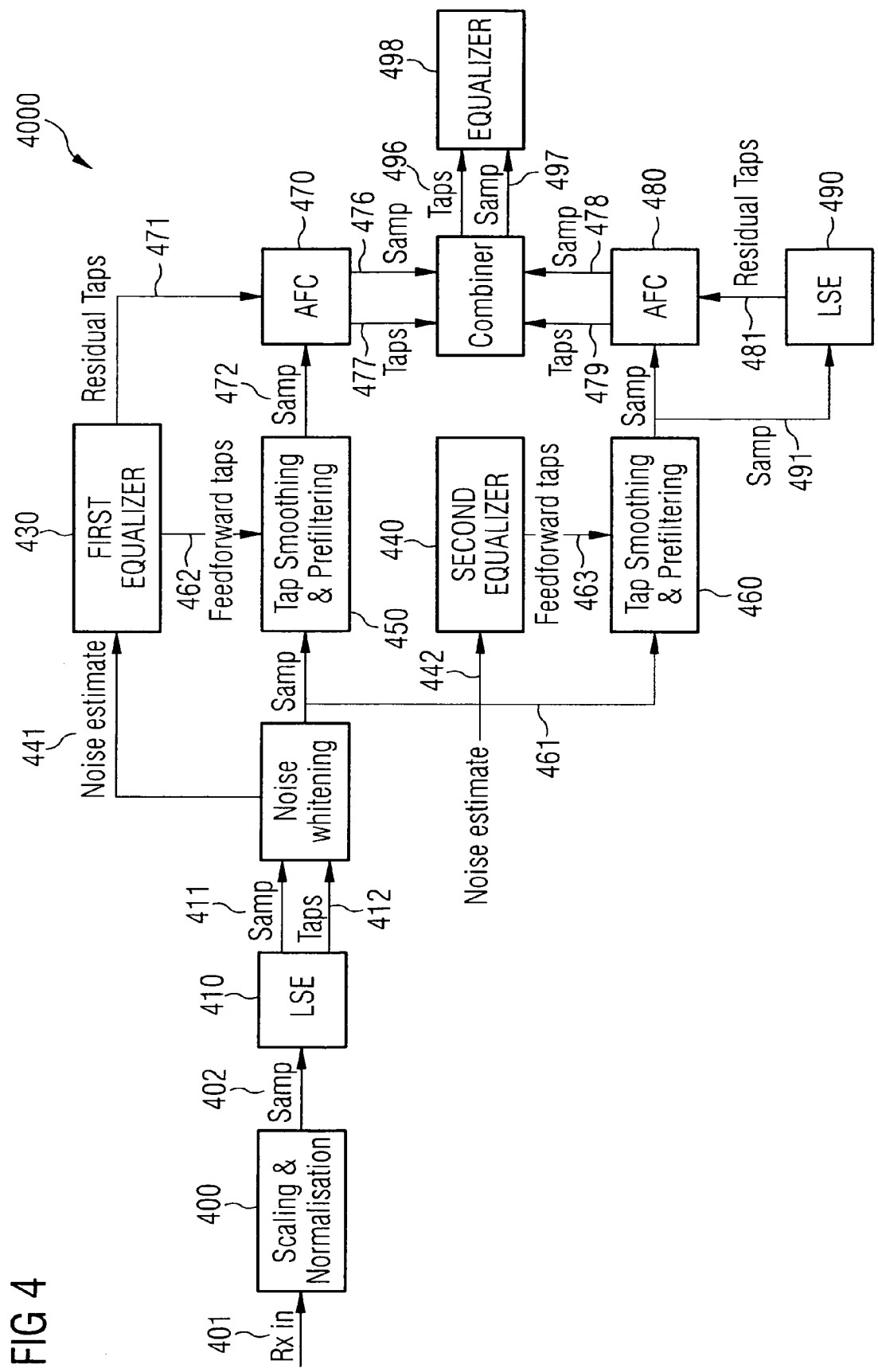
FIG. 4 illustrates a hybrid receiver according to an exemplary embodiment.

As illustrated in FIG. 4, according to an exemplary embodiment both equalizers, for example FD-LE and FD-DFE, processing algorithms are included and implemented. As illustrated in FIG. 4, a receiver chain 4000 includes a scaling and normalization unit 400 receiving an input 401 and providing a sample 402 to an LSE unit 410 that provides a sample 411 and a tap 413 to a noise whitening unit 420.

As illustrated in FIG. 4, the receiver chain includes both a first equalizer unit, for example, a FD-DFE unit 430, and a second equalizer unit, a FD-LE unit 440 that respectively receive noise estimates 441 and 442, for example, from the noise whitening unit 420. As illustrated in FIG. 4, the receiver chain 4000 also includes tap smoothing and prefiltering units 450 and 460 receiving a sample 461 from the noise whitening unit 420 and feedforward taps 462 and 463, respectively, from the FD-DFE unit 430 and a FD-LE unit 440.

As illustrated in FIG. 4, AFC unit 470 receives a residual tap 471 from the FD-DFE unit 430 and a sample 472 from the tap smoothing and prefiltering unit 450. The AFC unit 480 receives a residual tap 481 from the LSE unit 390 and a sample 491 from the tap smoothing and prefiltering unit 350.

As illustrated in FIG. 4, after pre-filtering, the parallel paths of FD-DFE samples 476 and residual taps 477 and FD-LE samples 478 and residual taps 479 can be combined by the combiner 495 and using appropriate weights. The combiner 495 outputs a tap 496 and a sample 497, for example, to an equalizer 498. The input of data and/or a program encoded with processing can be provided by a computer-readable media 407.

According to an exemplary embodiment, a pre-detection combining and a post-detection combining (before and after the equalizer path metric computation) can also be considered to support different baseband architectures and hardware implementations.

Weights for the algorithmic combining can be optimized depending on the expected SNR range of the application. In addition, or alternatively, weights can be estimated based on real-time information such as noise power.

A Frequency Domain Linear Equalizer (FD-LE) may be considered a subset of a Frequency Domain Decision Feedback Equalizer (FD-DFE). Thus, the including of FD-LE and FD-DFE is not increasing the overall complexity of the receiver. Thus, most of the parameters that may be estimated for a FD-DFE may be reusable for a FD-LE.

According to an exemplary embodiment of the present invention, terminal platform design is also improved. Typically, a Base Station is utilized with standardized performance requirements that are defined for a single antenna receiver. Therefore, an exemplary embodiment will enable a BTS in better achieving performance requirements.

Conventionally, comparisons of FD-LE and FD-DFE for several modulations and propagation scenarios have been made. However, such comparisons assume that channel information is known to the receiver. In other words, the comparisons assume perfect channel knowledge.

According to an exemplary embodiment of the present invention, however, channel knowledge is not necessarily assumed to be perfect. That is, FD-LE can provide less estimation errors compared to FD-DFE when input signal conditions are perfect. However, FD-DFE can show significant benefits over FD-LE in areas where noise and interference play major roles.

Figure 5:
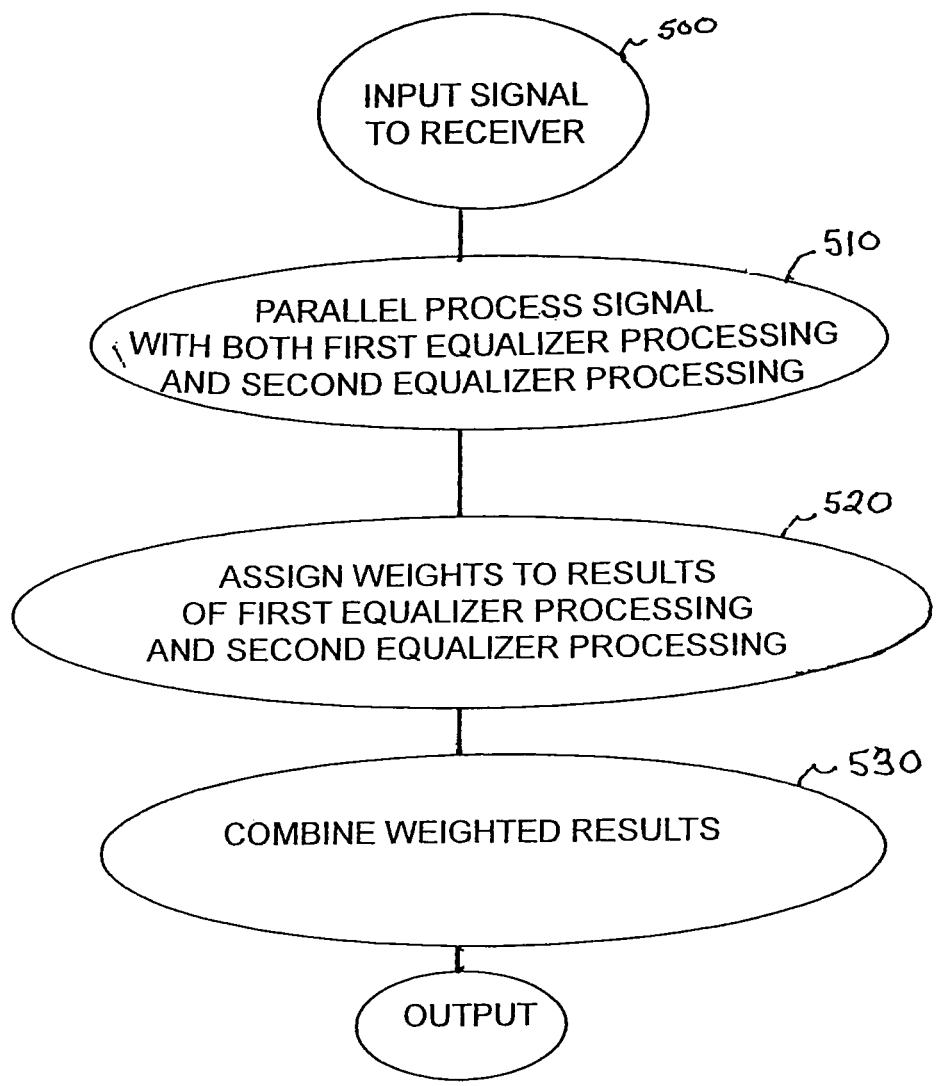
FIG. 5 illustrates a method of combining different receiver processing algorithms according to an exemplary embodiment.

FIG. 5 illustrates a method of improving communication performance according to an exemplary embodiment. In an exemplary method, as illustrated in FIG. 5, a signal is input into a receiver (Operation 500). The inputted signal is processed by both a first equalizer processing algorithm, for example, a Frequency Domain Linear Equalizer (FD-LE) processing algorithm and with a second equalizer processing algorithm, for example, a Frequency Domain-Decision Feedback Equalizer (FD-DFE) processing algorithm (Operation 510). The method includes assigning a weight value to each of the results of the first equalizer processing, for example, FD-LE processing and the second equalizer processing, for example, FD-DFE processing (Operation 520).

As illustrated in FIG. 5, the data is further combined (Operation 530). The assigning a weight value (Operation 530) can further include assigning a weight value based on an expected signal-noise ratio of an application or on a noise power.

Figure 6:
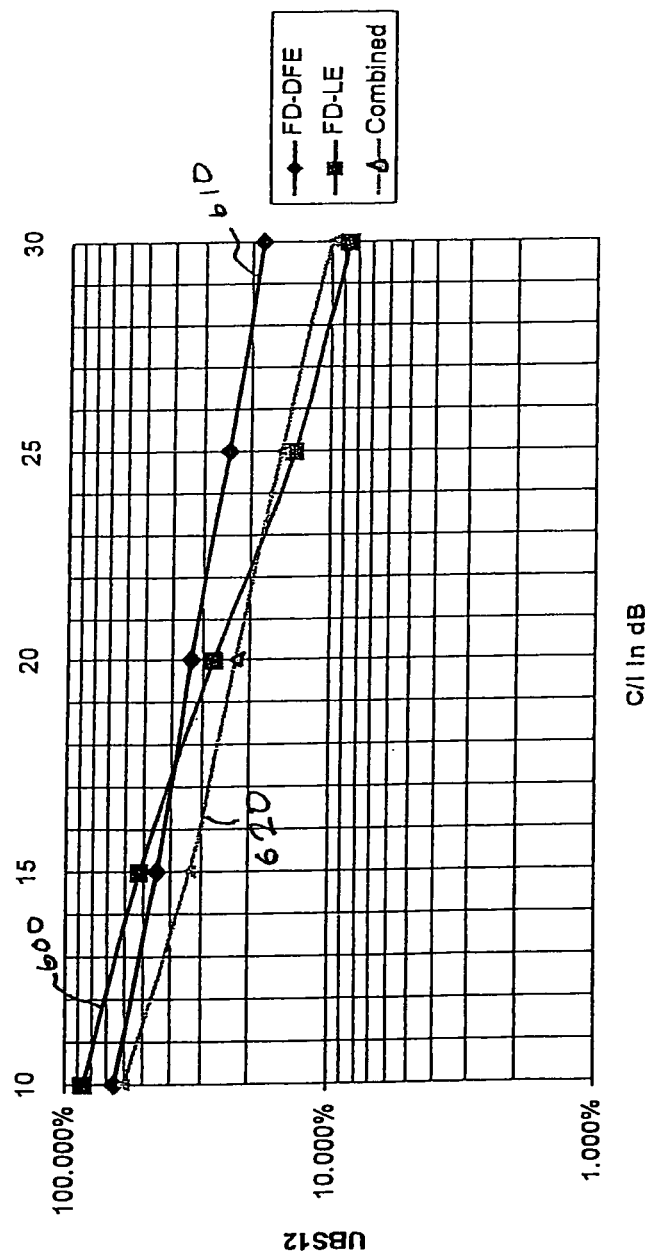
FIG. 6 illustrates exemplary single co-channel interference performance.
Figure 7:
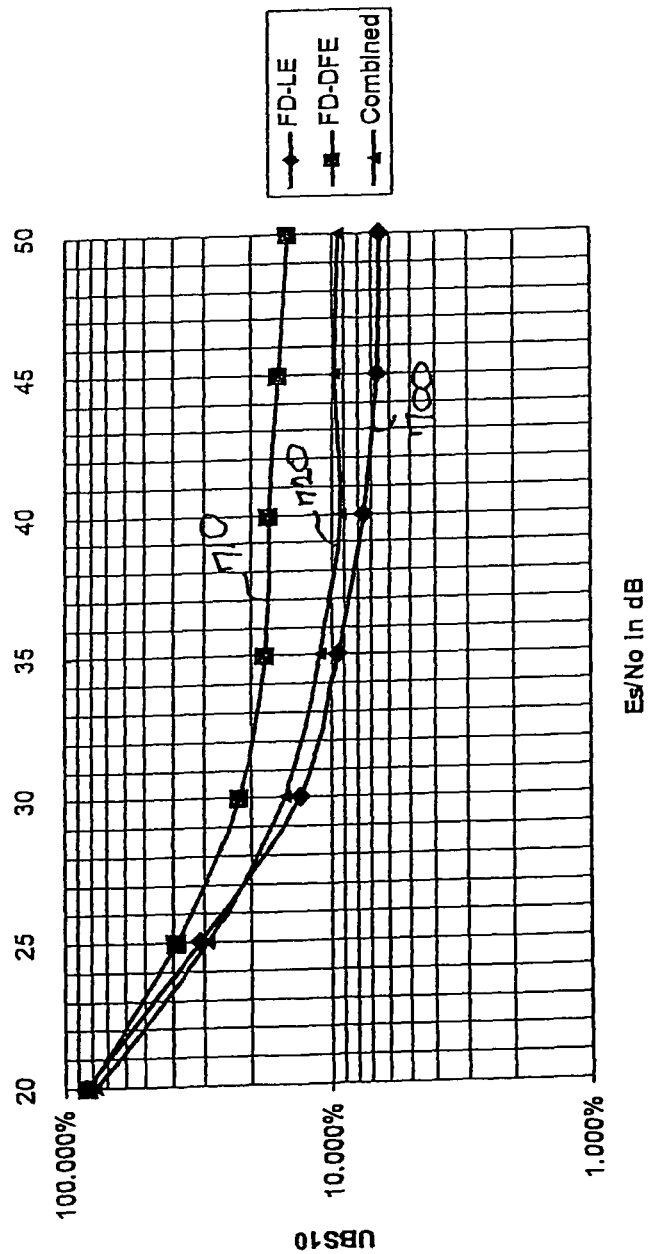
FIG. 7 illustrates exemplary sensitivity performance.

FIGS. 6 and 7 illustrate behavior of two equalizers, for example, FD-LE and FD-DFE for two different, example EGPRS2 coding schemes and scenarios. FIG. 6 illustrates an example comparison of a single co-channel interference performance for a FD-LE only processing approach 600, a FD-DFE only processing approach 610, and an exemplary embodiment including a combined FD-LE and FD-DFE processing 620.

FIG. 7 illustrates an example comparison of sensitivity performance for a first equalizer, for example, FD-LE only processing approach 700, a second equalizer, for example, a FD-DFE only processing approach 710, and an exemplary embodiment including a combined equalizer, for example, FD-LE and FD-DFE processing 720.

An EGPRS2 system can introduce modulation and coding schemes where operating points lie in a wide range of C/I or SNR. In addition, the coding schemes used by the transmitter may not be known to an inner receiver equalizer until after a decoding of a header at an outer receiver, e.g., by a channel decoder. Thus, such a receiver cannot be switched, or tuned, to a desired coding scheme to optimize the performance.

However, a single hybrid receiver solution according to an exemplary embodiment can be utilized to optimize the performance for a wide range of SNR and C/I conditions.

The performance of an exemplary embodiment can meets the 3GPP requirement with adequate margin. Thus, exemplary embodiments can result in improvements in EGPRS2 modulation and coding schemes to address GSM Evolution for 3rd Generation Partnership Project (3GPP), for example. Example performance evaluations can be accomplished using higher order modulations for example, a n-valued Phase Shift Keying/q-valued Quadrature Amplitude Modulation receiver (n-PSK/q-QAM receiver).

Further, an exemplary embodiment can be utilized in various type of compact and modular base stations to assist in cost savings in site deployment operations and increasing of coverage per station.

The embodiments can be implemented in computing hardware (computing apparatus) and/or software, and/or as an update to an existing software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A hybrid receiver apparatus, comprising:
    a first equalizer processor as a first receiver processor;
    a second equalizer processor as a second receiver processor;
    a scaling and normalization unit inputting a received signal;
    a Least Square Estimates (LSE) unit receiving a sample from the scaling and normalization unit;
    a noise whitening unit receiving a sample and a tap from the LSE unit; and
    a tap smoothing and prefiltering unit receiving a sample from the noise whitening unit, a feedforward tap from the first receiver processor, and a feedforward tap from the second receiver processor,
    wherein one of the first equalizer processor and the second equalizer processor is a time domain equalizer processor and a signal input by the hybrid receiver apparatus is processed by both the first receiver processor and the second receiver processor.

2. A hybrid receiver apparatus, comprising:
    a frequency domain-linear equalizer (FD-LE) processor;
    a frequency domain-decision feedback equalizer (FD-DFE) processor;
    a combiner unit combining first data output from the frequency domain-linear equalizer processor with second data output from the frequency domain-decision feedback equalizer processor based on a first weight value assigned the first data and a second weight value assigned the second data; and
    an equalizer inputting a tap and a sample from the combiner unit.

3. The hybrid receiver apparatus according to claim 2, further comprising:
    a scaling and normalization unit inputting a received signal;
    a Least Square Estimates (LSE) unit receiving a sample from the scaling and normalization unit;
    a noise whitening unit receiving a sample and a tap from the LSE unit; and
    a tap smoothing and prefiltering unit receiving a sample from the noise whitening unit, a feedforward tap from the FD-LE processor, and a feedforward tap from the FD-DFE processor.

4. The hybrid receiver apparatus according to claim 2, further comprising an Automatic Frequency Correction (AFC) unit receiving a sample from a tap smoothing and prefiltering unit and providing an output to the combiner unit.

5. A non-transitory computer readable storage medium encoded with a program that when executed by the computer enables the computer to improve communication performance by executing a method comprising:
    processing an inputted signal with a Frequency Domain Linear Equalizer (FD-LE) processing algorithm and with a Frequency Domain-Decision Feedback Equalizer (FD-DFE) processing algorithm;
    assigning a weight value to a result of each of two different receiver processing algorithms;
    combining data output from the FD-LE processing algorithm that is assigned a first weight value with data output from the FD-DFE processing algorithm that is assigned a second weight value; and
    outputting data based on the assigning of the weight value.

6. The computer readable storage media according to claim 5 encoded with a program that when executed by the computer enables the computer to improve communication performance by further assigning the weight value based on a value representing a real-time performance of the communications.

7. A method of improving communication performance comprising:
    deriving samples from two or more different receiver signal processing paths using at least two different receiver processing algorithms, one of which is a time domain equalizer processing algorithm, to produce derived samples;
    scaling and normalizing the derived samples to produce normalized samples;
    calculating a least square estimate of each of the normalized samples to produce estimated samples;
    noise whitening of the estimated samples to produce noise whitened samples;
    smoothing and prefiltering the noise whitened samples and the derived samples to produce smoothed samples; and
    combining the derived-smoothed samples.

* * * * *

UNITED STATES PATENT AND TRADEMARK OFFICE
CERTIFICATE OF CORRECTION

PATENT NO. : 8,483,335 B2
APPLICATION NO. : 12/320661
DATED : July 9, 2013
INVENTOR(S) : Hasan et al.

Page 1 of 1

It is certified that error appears in the above-identified patent and that said Letters Patent is hereby corrected as shown below:

In the Claims:

In Col. 8, Line 52, In Claim 7, delete "derived-smoothed" and insert -- smoothed --, therefor.

Signed and Sealed this
Twenty-ninth Day of October, 2013

Teresa Stanek Rea
*Deputy Director of the United States Patent and Trademark Office*